(12) United States Patent
Buyuktosunoglu et al.

(10) Patent No.: US 9,396,143 B2
(45) Date of Patent: *Jul. 19, 2016

(54) HIERARCHICAL IN-MEMORY SORT ENGINE

(71) Applicant: International Business Machines Corporation, Armonk, NY (US)

(72) Inventors: Alper Buyuktosunoglu, White Plains, NY (US); Srivatsan Chellappa, Tempe, AZ (US); Toshiaki Kirihata, Poughkeepsie, NY (US); Karthik V. Swaminathan, State College, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,050

(22) Filed: Dec. 4, 2015

(65) Prior Publication Data
US 2016/0085702 A1    Mar. 24, 2016

Related U.S. Application Data

(63) Continuation of application No. 14/294,710, filed on Jun. 3, 2014, now Pat. No. 9,268,863.

(51) Int. Cl.
G06F 12/08    (2016.01)
G06F 13/34    (2006.01)
G06F 17/30    (2006.01)
G06F 13/16    (2006.01)
G06F 13/374   (2006.01)

(52) U.S. Cl.
CPC ............ *G06F 13/34* (2013.01); *G06F 12/0897* (2013.01); *G06F 13/1626* (2013.01); *G06F 13/1663* (2013.01); *G06F 13/374* (2013.01); *G06F 17/30867* (2013.01); *G06F 2212/154* (2013.01)

(58) Field of Classification Search
CPC . G06F 13/34; G06F 13/1626; G06F 13/1663; G06F 13/374; G06F 12/0897; G06F 17/30867
USPC ........................................ 711/122, 154, 156
See application file for complete search history.

(56) References Cited

U.S. PATENT DOCUMENTS 4,991,134 A    2/1991   Ivsin
5,146,590 A    9/1992   Lorie et al.
(Continued)

OTHER PUBLICATIONS

Koch et al., "FPGASort: A High Performance Sorting Architecture Exploiting Run-time Reconfiguration on FPGAs for Large Problem Sorting", FPGA'11, Feb. 27-Mar. 1, 2011, pp. 1-10.
(Continued)

*Primary Examiner* — Stephen Elmore
(74) *Attorney, Agent, or Firm* — Reza Sarbakhsh; Steven Meyers

(57) ABSTRACT

A local sorting module includes a set of storage elements storing binary vectors configured in a one-dimensional (1D) or two-dimensional (2D) array structure and separated by respective comparators configured to conditionally compare and sort the binary vectors. The comparators may perform a sort using a compare-and-flip or a compare-and-swap operation. Local sorting modules may be coupled with a global sorting module for enabling a tournament sort algorithm to output values stored in storage elements one at a time until all data is outputted in a predetermined sorting order.

13 Claims, 8 Drawing Sheets

(56) References Cited

U.S. PATENT DOCUMENTS

| | | | |
|---|---|---|---|
| 5,168,567 | A | 12/1992 | Everson et al. |
| 5,287,494 | A | 2/1994 | Garcia et al. |
| 5,504,919 | A | 4/1996 | Lee et al. |
| 5,621,908 | A | 4/1997 | Akaboshi et al. |
| 6,181,678 | B1 | 1/2001 | Ha-Duong et al. |
| 6,889,287 | B2 * | 5/2005 | Sasaki ............... G06F 12/0292 365/189.16 |
| 6,987,683 | B2 | 1/2006 | Ao |
| 7,177,319 | B2 | 2/2007 | Buchert et al. |
| 7,281,090 | B2 * | 10/2007 | Sasaki ............... G06F 12/0292 365/189.011 |
| 7,363,304 | B2 | 4/2008 | Lewis et al. |
| 7,370,046 | B2 | 5/2008 | Imai |
| 7,554,077 | B2 | 6/2009 | Chiu |
| 7,849,289 | B2 | 12/2010 | Furusho |
| 8,261,043 | B2 | 9/2012 | Inoue et al. |
| 8,661,033 | B2 | 2/2014 | Leppert et al. |
| 8,914,338 | B1 | 12/2014 | Wallace |
| 8,984,098 | B1 | 3/2015 | Tomkins et al. |
| 8,990,352 | B1 | 3/2015 | Kosslyn et al. |
| 2007/0156685 | A1 | 7/2007 | Inoue et al. |
| 2008/0281843 | A1 | 11/2008 | Furusho |
| 2014/0379735 | A1 | 12/2014 | Hsu et al. |

OTHER PUBLICATIONS

Kipfer, "GPU Gems 2", GPU Gems, Chapter 46, Improved GPU Sorting, http.developer.nvidia.com/GPUGems2/gpugems2_chapter46.html, pp. 1-21.

Zhang et al., "GPU Accelerate Parallel Odd-Even Merge Sort: An OpenCL Method", Proceedings of the 2011 15th International Conference on Computer Supported Cooperative Work in Design, 2011 IEEE, pp. 76-83.

Satish et al., Fast Sort on CPUs, GPUs and Intel MIC Architectures, Intel Labs, Technical Report, pp. 1-11.

Sklyarov et al., "High-performance Hardware Accelerators for Sorting and Managing Priorities", 2011 IEEE, pp. 1-6.

Alaparthi et al., "Sorting Binary Numbers in Hardware—A Novel Algorithm and its Implementation", 2009 IEEE, pp. 2225-2228.

Olariu et al., "An Optimal Hardware-Algorithm for Sorting Using a Fixed-Size Parallel Sorting Device", IEEE Transactions on Computers, vol. 49, No. 12, Dec. 2000, pp. 1310-1324.

Marcelino et al., "On Implementing Sorting Network Machines with FPGAs", pp. 1-4.

Pending U.S. Appl. No. 15/063,315, filed Mar. 7, 2016, Entitled, "Hierarchical In-Memory Sort Engine", 42 Pages, Buyuktosunoglu et al.

* cited by examiner

HIERARCHICAL IN-MEMORY SORT ENGINE

FIELD OF THE INVENTION

The present disclosure generally relates to computer implemented sorting techniques and tools, and more particularly to hardware-implemented sort engines.

BACKGROUND

Sorting and searching data have several applications in the database and analytics domains. Sorting operations involve reordering data in a particular order, and a conditional search operation may involve retrieving a particular entry from the sorted data. Responding to queries to the database, ranking these responses based on their relevance or other metrics, and determining the most frequently accessed entries are some of the operations that may depend on such sorting and conditional searching. These operations usually involve processing large amounts of data.

Data is conventionally fetched from a storage device, such as memory or caches, to a general purpose computation module (usually a processor), which carries out the sort and search operations. One algorithm used for sorting is the Batcher's Odd-Event Sort. Existing software and hardware implementations of this sort algorithm have several limitations and drawbacks, including, for example, large overhead, slow speed, and high cost.

Batcher's Odd-Event Sort may be implemented, for an array of n elements $X_1$ to Xn, as follows. An odd-even pair may be defined as a first element having an odd subscript, and a next element having an even subscript. In a first step of the sort operation, every element with an odd subscript, i.e., $X_1$, $X_3$, ..., is compared with its respective successor element having an even subscript, i.e., $X_2$, $X_4$, .... For any given comparison, in the case of an ascending sort operation, if the odd element is greater than the even element, the two elements are swapped. This operation is performed for every odd-even pair in the array. In a second step, every element with an even subscript is compared with its successor element with an odd subscript, and their values are swapped if the element with the even subscript is larger. This operation is performed for every even-odd pair in the array. The operations of the first and second steps are repeated, alternately, until the entire array is sorted.

BRIEF SUMMARY

According to at least one embodiment, an in-memory sort engine that performs sort operations, including Batcher's Odd-Even Sort while increasing speed and reducing overhead and cost, and provides for custom programming, may be provided.

Accordingly, one embodiment of the present disclosure includes a sorting module including a two-dimensional (2D) local sorting module. The 2D local sorting module may include a first data storage element, a second data storage element adjacent to the first data storage element along a first axis, whereby the first and second data storage elements are operatively connected via a first comparator, a third data storage element adjacent to the second data storage element along a second axis, where the second axis is substantially perpendicular to the first axis, whereby the second and third data storage elements are operatively connected via a second comparator, a fourth data storage element adjacent to the third data storage element along the first axis, and adjacent to the first data storage along the second axis, whereby the third and fourth data storage elements are operatively connected via a third comparator, and the first and fourth data storage elements are operatively connected via a fourth comparator.

The first, second, third, and fourth comparators may be configured to logically compare data stored in adjacent ones of the first, second, third, and fourth data storage elements according to a sorting order indicated by a processor. The embodiment may also include a completion detector configured to detect outputs of the first, second, third and fourth comparators to determine a completion of sorting operations.

A further embodiment of the disclosure may include a hardware-implemented local sorting module. The local sorting module may include first and second data storage elements operatively connected to a first comparator for comparing first and second data words stored in the first and second data storage elements, where for each bit in the first data word, the first storage element includes a first storage device receiving an input from a multiplexer (MUX). The MUX may include the following elements: a first MUX input corresponding to a first bit of the first data word; a second MUX input corresponding to a first bit of an external input data word; a third MUX input corresponding to a first output generated by a first XOR gate receiving both a second output of a first AND gate and the first bit of the first data word, the first AND gate receiving both a third output of the first comparator and a fourth output of a second XOR gate, the second XOR gate receiving both the first bit of the first data word and a first bit of the second data word stored in the second data storage element. The MUX may also include a plurality of control signals for selecting the first, second, or third MUX input, wherein at least one of the plurality of control signals corresponds to the third output.

A further embodiment of the disclosure may include a hardware implemented method for sorting a group of data words. The method may load, using a processor, first and second sets of data words in the group of data words into first and second two-dimensional (2D) local sorting modules. The method may locally sort the first set of data words using the first 2D local sorting module, and may further locally sort the second set of data words using the second 2D local sorting module. The method may globally sort the locally sorted first set of data words and the locally sorted second set of data words using a global sorting module.

DETAILED DESCRIPTION

Figure 1:
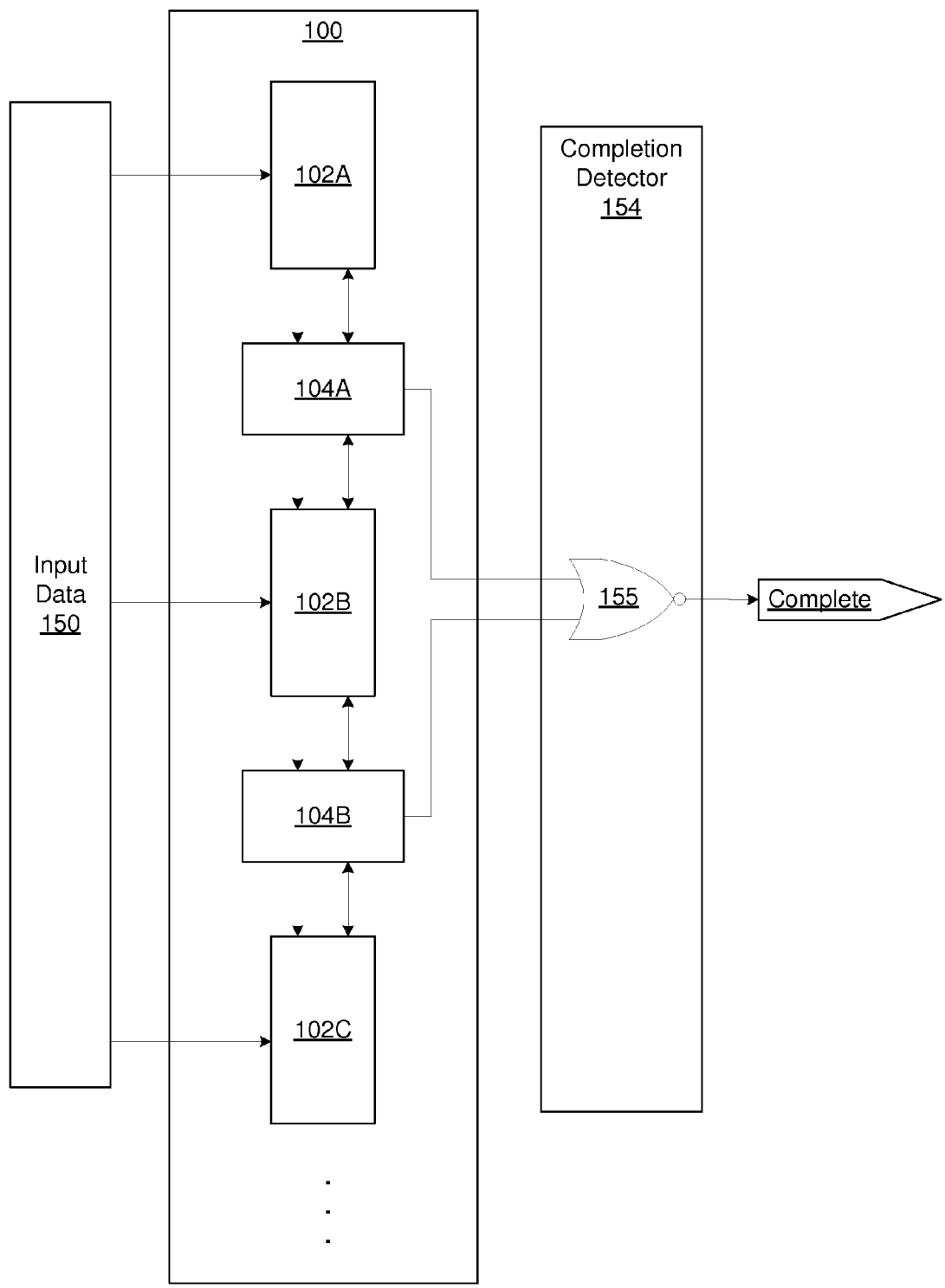
FIG. 1 depicts an exemplary one-dimensional local sorting module, according to an embodiment of the present disclosure.

FIG. 1 depicts an exemplary one-dimensional (1D) local sorting module 100, according to an embodiment of the present disclosure. The local sorting module 100 may be used to sort data values (also referred to as data words) that it receives as input. The local sorting module 100 may be an integrated circuit (IC) on board a computer processing chip (processor), or may be an off-chip circuit operatively connected to the processor. Additional details on the placement of the local sorting module 100 within a computer's and/or a processor's architecture are discussed in greater detail below in connection with FIGS. 7A-B.

The local sorting module 100 may receive input data 150, for sorting, from an input source. The input source may include, for example, the processor, a programming circuit within or connected to the processor, caches, memory, other internal or external data sources within the memory hierarchy of the computer system within which the processor is integrated, or a combination thereof. The local sorting module 100 may store the received input data 150 in storage elements 102A-C. Each storage element 102A-C may include, for example, a latch-based memory structure, such as a flip-flop, that stores the input data 150. Other memory structures may be used as well. The local sorting module 100 may have additional storage elements (not shown) that may store additional input data 150. The number of instances of data inputs 150 need not equal the number of storage elements 102 that are available in the local sorting module 100. According to one embodiment, each storage element 102A-C may store a data value having a size of a 32-bit word.

The local sorting module 100 may also include one or more comparators 104A-B, each separating a pair of adjacent storage elements 102A-C. Each additional storage element 102 may be separated from an adjacent storage element by an additional comparator 104. According to one embodiment, each comparator 104A-B may be a digital binary comparator configured to perform a sort operation between data values stored in a pair of adjacent storage elements 102. The comparators 104 may perform bitwise conditional comparison and sort ("compare-sort") operations using, for example, a compare-and-flip or a compare-and-swap operation ("flip/swap"), based on contents of the pair of adjacent storage elements 102. For example, the comparator 104A may compare and flip/swap the data in one storage element 102A with the data in another storage element 102B, according to a comparison order (ascending or descending) as determined by the processor and/or the program circuitry. Similarly, the comparator 104B may compare and flip/swap the data in the storage element 102B with the data in the storage element 102C.

The compare-sort operations of the comparators 104 may be used to perform odd-even sort operations. Data values stored in pairs of adjacent storage elements 102 may be compared by their corresponding intermediary comparator 104. For example, in one clock cycle, the comparator 104A may compare, and sort if necessary, the data values stored in the storage elements 102A and 102B; this may be considered a comparison between an odd/even pair of storage elements 102. In a following cycle, the comparator 104B may compare, and sort if necessary, the data values of the storage elements 102B and 102C; this may be considered a comparison between an even/odd pair. Through successive cycles, therefore, the local sorting module may perform the Batcher's Odd-Even Sort, until the data in all the storage elements 102 are sorted.

According to an aspect of the disclosure, the comparators 104 may perform a sort operation using a compare-and-flip technique. In one example, the comparator 104A may determine that the value stored in the storage element 102A (the "first value") is larger than the value in the storage element 102B (the "second value"). In order to sort these two values in ascending order, the comparator 104A stores the second value in the storage element 102A, and the first value in the storage element 102B, by selectively flipping non-matching bits of each storage element 102A-B as necessary, whilst leaving other bits (i.e., the matching bits) unchanged. Additional details of this technique are discussed in greater detail in connection with FIGS. 2A-B, below. Amongst other benefits, the compare-and-flip technique may lead to power efficiencies by changing only bits that require such change.

According to a further aspect of the present disclosure, the comparators 104 may perform a sort using a compare-and-swap technique. In one example, the comparator 104A may determine that the value stored in the storage element 102A (the "first value") is larger than the value in the storage element 102B (the "second value"). In order to sort these two values in ascending order, the comparator 104A stores the second value in the storage element 102A, and the first value in the storage element 102B, by swapping the two values. Additional details of this technique are discussed in greater detail in connection with FIG. 3, below.

The order of sorting by the comparators 104A-B may be determined, in one embodiment, directly or indirectly, via one or more input ports to the comparators 104A-C. For example, a program may require a set of data to be sorted in ascending order, or in descending order. The program may direct the processor to cause the comparators 104A-B to swap the contents of the storage elements 102A-C in either a predetermined ascending or a predetermined descending order. In another embodiment, the order in which the sort is performed may be preconfigured into the internal circuitry of the comparators 104A-B.

According to an aspect of the present disclosure, an output of each comparator 104A-B may be fed to a completion detector 154 (FIG. 1), which detects when no sort operations have been performed after a set of comparisons, indicating that the data in the storage elements is properly sorted, and that no additional comparisons are necessary. The completion detector may include, for example, a NOR gate 155 that receives inputs corresponding to outputs of the comparators 104. As will be discussed below in connection with FIGS. 2A-B, a logic HIGH (hereinafter, "HIGH") output of a comparator 104 indicates that the data values stored by the corresponding storage elements 102, whose values the comparator 104 compares, are out of order and should be sorted. Conversely, a logic LOW (hereinafter, "LOW") output indicates that the data values stored in the corresponding storage elements 102 are in order. Therefore, in a given comparison cycle, if the data values in all storage elements 102 are sorted, the outputs of all comparators 104 are LOW. Since these outputs are fed as inputs to the NOR gate 155, the output of the NOR gate 155 is HIGH under these logic conditions. A HIGH or LOW output from the NOR gate 155 corresponds, in the disclosed embodiment, to an output of the completion detector 154. A HIGH output indicates that sorting operations of the local sorting module 100 are complete. Conversely, a LOW output indicates that sorting operations of the local sorting module 100 are incomplete.

According to an embodiment of the disclosure, the local sorting module 100 may operatively be connected to one or more clocks (not shown in FIG. 1) that synchronize its operations, such that each comparator 104A-B may perform one comparison per clock cycle. The total sorting cycle may depend on the particular implementation of the disclosed embodiment; however, at most, n clock cycles may be required for sorting n data values stored in n data storage elements 104.

As discussed below in connection with FIGS. 5-6, the local sorting module 100 depicted in FIG. 1 may be operatively connected to one or more additional local sorting modules 100 to perform parallel sorting operations, and/or to facilitate a hierarchical sorting operation.

Figure 2A:
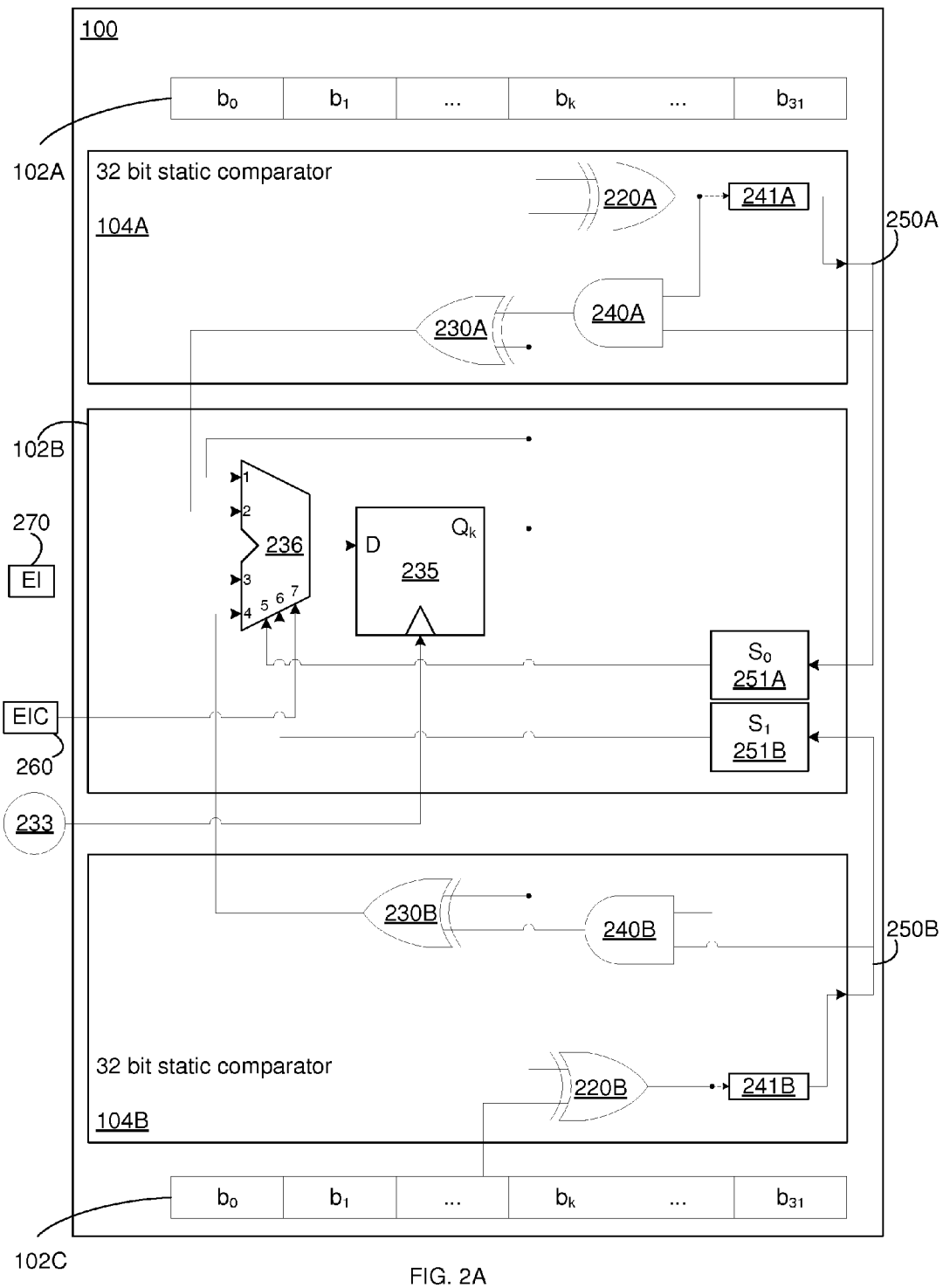
FIG. 2A depicts an exemplary circuit-level implementation of the one-dimensional local sorting module of FIG. 1, using a compare-and-flip technique, according to an embodiment of the present disclosure.

FIG. 2A depicts an exemplary circuit-level implementation of the 1D local sorting module 100 of FIG. 1, using a compare-and-flip technique, according to an embodiment of the present disclosure. Like elements in FIGS. 1 and 2A are labeled with like reference characters. The local sorting module 100 depicted in FIG. 2A performs an ascending sort, and includes the storage elements 102A-C, each of which can store up to a 32-bit word, and further includes the comparators 104A-B. It shall be understood by a person of ordinary skill in the art that the disclosed circuitry may also be used to perform a descending sort, and may further be modified to compare and sort data words of other sizes, without departing from the spirit and scope of the present disclosure.

In the depicted embodiment, the comparators 104A-B may be 32-bit static comparators configured to perform compare-and-flip operations between their respective adjacent storage elements 102 (for example, storage element 102A and 102B, or storage elements 102B and 102C). Accordingly, each data value stored in a storage element 102 may be a 32-bit word consisting of 32 bits numbered $b_0$-$b_{31}$, wherein $b_0$ and $b_{31}$ are the 32-bit word's Most Significant Bit (MSB) and the Least Significant Bit (LSB), respectively. Given a binary vector such as (0101 ... 0101), the leftmost bit is the MSB (0) and the rightmost bit is the LSB (1). It shall be apparent to a person of ordinary skill in the art that bit-words of other sizes and other bit position conventions may be used without departing from the spirit and scope of the present disclosure.

With continued reference to FIG. 2A, the storage element 102B is depicted at a different level of detail than the storage elements 102A and 102C, although these storage elements may, but need not, be identical. The internal circuitry of the storage element 102B is depicted only with respect to its $k^{th}$ bit, while the storage elements 102A and 102C are depicted more generally, including their respective 32 bits $b_0$-$b_k$-$b_{31}$ in block form. It shall be understood by a person of ordinary skill in the art, however, that the storage elements 102A-C may, but need not, be identical or similar to one another. For example, the storage element 102A may be a first storage element in the local sorting module 100, and may be connected only to the comparator 104A, whereas the storage element 102B may be an intermediary storage element and may be connected to two comparators 104A and 104B (it may also be connected to additional comparators, in some embodiments, as discussed with respect to FIGS. 4-6).

Each bit of a given 32 bit-word stored in a given storage element 102A-C may be set in a corresponding storage device or storage structure, such as a flip-flop 235, using a corresponding multiplexer (MUX) 236, whose data inputs and control inputs determine the value that is fed into and stored by the storage structure. Each flip-flop 235 may be set using a clock signal 233 fed into the flip-flop 235. According to one aspect of the disclosed embodiment, the local sorting module 100 may set a given flip-flop, for example, the flip-flop 235 of the storage element 102B, using a corresponding MUX 236 having the following exemplary Inputs 1-7:

Input 1: A feedback input corresponding to a $Q_k$ value, stored in and outputted by the flip-flop 235, where $Q_k$ corresponds to the $k^{th}$ bit of the data value stored in the storage element 102B. Input 1 may be coupled to the flip-flop 235 through the MUX 236 when all MUX selection signals $S_0$, and $S_1$, and EIC, are 0. Other embodiments of the present disclosure may be implemented without use of Input 1, whereby the data value (i.e., the bit) $Q_k$ stored in the flip-flop 235 is maintained, without being set again, by disabling a corresponding clock input 233 to the flip-flop 235.

Input 2: The output of an XOR gate 230A from the comparator 104A. This output may be used, for example, during an odd-even comparison execution cycle, to control whether $b_k$ of the storage element 102B should be flipped based on a comparison with $b_k$ of the storage element 102A. Input 2 may be coupled to the flip-flop 235 through the MUX 236 when the MUX selection signal $S_0$ is 1, $S_1$ is 0, and EIC is 0.

Input 3: An External Input (EI) 270, corresponding to a bit of an external data value to be stored in the flip-flop 235. This may be, for example, a bit from the input data 150 (FIG. 1). Input 3 may be coupled to the flip-flop 235 through the MUX 236 when an external input control signal (EIC) 260 to the MUX 236 is 1, while $S_0$ and $S_1$ are 0.

Input 4: The output of an XOR gate 230B from the comparator 104B. This output may be used, for example, during an even-odd comparison execution cycle, to control whether $b_k$ of the storage element 102B should be flipped based on a comparison with $b_k$ of the storage element 102C. Input 4 may be coupled to the flip-flop 235 through the MUX 236 when the MUX selection signal $S_1$ is 1, while $S_0$ and EIC are 0.

Input 5: An External Input Control (EIC) 260. This control allows the local sorting module 100 to store data into the flip-flops 235. When this control signal is 1, EI 270 is selected as the input so that the corresponding data bit is inputted to the flip-flop 235 and stored. When EIC 260 is 0, EI 270 is not selected. When EIC 260 is 0, $S_0$ and $S_1$ may be 0.

Inputs 6 & 7: Signal inputs $S_0$ 251A and $S_1$ 251B correspond to outputs 250A and 250B of the comparators 104A and 104B, respectively. These signals are used, in the depicted embodiment, to enable ascending sort operations using the MUX 236, and are enabled only when EIC 260 is LOW (in other embodiments, they may be used to enable descending sort operations). Additional details of the source of these outputs and signals and the effects they have on the circuitry of the local sorting module 100 are described in greater detail, below, in connection with FIG. 2B.

It should be noted that $S_1$ and $S_0$ are labeled as such for ease of reference, and to more clearly define operations of the local sorting module 100 and its components. However, it shall be apparent to a person of ordinary skill in the art that these control signals may correspond to outputs of comparators 104 (e.g., the comparator 104A and the comparator 104B).

Initially, each bit stored in the storage element 102B may be set based on a corresponding EI 270 bit value (Input 3 to the MUX 236) by setting EIC 260=1, $S_0$=0, $S_1$=0. The result of the MUX 236 in this instance is fed to the flip-flop 235, which stores the corresponding value (data from EI 270). As part of the local sorting module's 100 further operations during other cycles, the MUX 236 and the control signals may be used to select other inputs from the module's 100 internal circuitry to carry out a sort operation, where necessary.

With continued reference to FIG. 2A, for a given pair of adjacent storage elements 102 undergoing a comparison in a cycle, such as the storage elements 102A and 102B, the local sorting module 100 determines whether their respective data values should be sorted (i.e., reordered, according to a predetermined sorting order). Where this is the case, the local sorting module 100 may perform a bit-by-bit comparison of the two data values stored in the pair using the comparator 104A, and may flip bits that do not match.

For example, each comparator 104A-B may include 32 successive XOR gates 220 (for example, the XOR gates 220A in the comparator 104A, and the XOR gates 220B in the comparator 104B), each of which receives, as inputs, $k^{th}$ bits ($b_k$) of the two storage elements 102A-B whose data values the comparator is to compare, where k is in the range {0-31}. The output of each XOR gate 220A/B may be fed to other components of the circuitry of the local storage module 100, as described below, to further facilitate sorting operations. For example, this may include a priority decoder 241A/B component(s) of respective comparators 104A/B, described in greater detail in connection with FIG. 2B, below. This additional circuitry of the comparators 104A-B enables the local sorting module 100 to determine which of the two values under comparison is larger, and whether a sorting operation (using, for example, a flip technique) should be performed based on the two data values.

Where a comparator 104, for example, the comparator 104A, has determined that two values do not require sorting (i.e., reordering), based on results of the priority decoder(s) 241A (this result may correspond to the output 250A of the comparator 104A), then all MUX selection signals EIC, $S_0$, and $S_1$ may be set to 0. This results in transferring the $Q_k$ output back to the flip-flop 235, keeping the data bit stored therein the same. Other techniques for maintaining the value stored in the flip-flop 235 are possible (for example, the clock 233 input to the flip-flop 235 may be disabled).

Where a comparator 104, for example, the comparator 104A, has determined that two values should be sorted (i.e., reordered) based on results of the priority decoder(s) 241A (this result may correspond to the output 250A of the comparator 104A), it may compare the $b_k$ bit of the storage element 102A to the $b_k$ bit of the storage element 102B, for all k values {0-31}, and flip bits that do not match. Initially, each such $b_k$ is stored in a flip-flop 235 of the corresponding storage element 102A/B that feeds into the XOR gate 220A. The result of the XOR gate 220A is fed into an AND gate 240A, along with the result 250A of the comparator 104A. The result of the AND gate 240A, as well as $Q_k$ (the $b_k$ value of the storage element 102B), are fed into an XOR gate 230A. The output of the XOR gate 230A is inputted to the MUX 236 in the storage element 102B. The output 250A of the comparator 104A may additionally be inputted to a MUX (not shown) of the storage element 102A as a corresponding control signal $S_1$ (not shown) within the storage element 102A.

Similarly, during a separate cycle, the comparator 104B may compare the $b_k$ bit of the storage element 102B to the $b_k$ bit of the storage element 102C, wherein the XOR gate 220B receives as inputs respective $b_k$ bits of the two storage elements 102B and 102C. The result of the XOR gate 220B and the result 250B of the comparator 104B are fed into the AND gate 240B. The result of the AND gate 240B and $Q_k$ are fed into an XOR gate 230B, whose output is fed into the MUX 236. The output of the XOR gate 220B is also fed into the priority decoder(s) 241B. The output 250B of the comparator 104B is additionally fed into the MUX 236 as a control signal, e.g., $S_1$ 251B. The output 250B may also be fed into a MUX (not shown) of the storage element 102C as a corresponding control signal $S_0$ (not shown).

As discussed above and as illustrated in FIG. 2A, the storage element 102B may be an intermediary storage element, i.e., neither the first nor the last storage element 102 of the local sorting module 100. However, first and last storage elements 102 (e.g., the storage elements 102A and 102C) may have similar internal circuitry, except that they may (but need not) be connected to only one comparator. For example, a MUX of a $b_k$ bit of the storage element 102A may have fewer inputs than that of the storage element 102B (it may, for example, have only inputs 1, 3, and 4, and control signals EIC and $S_0$, where $S_0$ corresponds to the output 250A of the comparator 104A). Similarly, a MUX of a $b_k$ bit of the storage element 102C may have fewer inputs than that of the storage element 102B (it may, for example, have only inputs 1, 2, and 3, and control signals EIC and $S_0$, where $S_0$ corresponds to the output 250B of the comparator 104B).

As an illustrative example, let $V_A$={a binary vector stored in the storage element 102A}, $V_B$={a binary vector stored in the storage element 102B}; $Q_{kA}$={$b_k$ bit in $V_A$}; and $Q_{kB}$={$b_k$ bit in $V_B$}, where k is in the range {0-31}. The comparator 104A may compare $V_A$ and $V_B$ during an odd-even comparison cycle, and reorder them if necessary, to sort them in ascending order. Prior to a comparison operation, a given $Q_{kA/B}$ value may be stored in the flip-flop 235 of its respective storage element 102A/B. In one comparison cycle, $Q_{kA}$ and $Q_{kB}$ are fed into the XOR gate 220A. There are three comparison scenarios to consider: $V_A$=$V_B$, $V_A$>$V_B$, and $V_A$<$V_B$.

In the first scenario, where $V_A$=$V_B$, the output of the priority decoder(s) 220A, and a corresponding comparator 104A output 250A, are LOW, indicating that $V_A$ and $V_B$ are equal and should not be reordered (the manner in which these outputs are determined are discussed below in connection with FIG. 2B). The AND gate 240A takes, as a first input, the output 250A of the comparator 104A. Since the output 250A is LOW, the output of the AND gate 240A is LOW, regardless of a second input to the AND gate 240A (i.e., where the output 250A is LOW, the $b_k$ bits of the storage elements 102A and 102B cannot cause a sort operation). This ensures that the value of $Q_{kB}$ remains the same, since the output 250A is LOW and is fed into the MUX 236 as the control $S_0$ 251A. The MUX 236 may be configured such that when $S_0$ 251A is LOW (other MUX 236 selection signals EIC and $S_1$ also are 0), it selects Input 1 corresponding to $Q_{kB}$. Alternatively, to retain the flip-flop 235 data bit, the clock input 233 to the flip-flop 235 may be disabled where a reordering is not required (e.g., where VA=VB, or where all MUX selection signals EIC, $S_0$, and $S_1$ are LOW).

In the second scenario, where $V_A$>$V_B$, the output of the priority decoder(s) 220A, and a corresponding comparator 104A output 250A, are HIGH. Therefore, the comparator 104A sorts the two binary vectors by flipping their respective non-matching bits. This is accomplished using, in part, the XOR gate 220A, whose output is LOW if the $Q_{kA}$=$Q_{kB}$. If the output is LOW, it causes the output to the AND gate 240A to be LOW. This ensures that the output of the XOR gate 230A is HIGH only if $Q_{kB}$ is (1). Since $S_0$ 251A is set to 1 (in this example) based on the output value 250A of the comparator 104A, it is HIGH where $V_A > V_B$, and the MUX 236 may be configured to select Input 2 corresponding to the output of the XOR gate 230A. Therefore, the output of the XOR gate 230A will correspond, under these logic conditions, to the value of $Q_{kB}$, which is selected as an input to the MUX 236 and fed back to the flip-flop 235. Accordingly, where $V_A > V_B$ and $Q_{kA} = Q_{kB}$, no bits are flipped.

However, if $V_A > V_B$, but $Q_{kA} > Q_{kB}$, the output of the XOR gate 220A, as well as the output 250A of the comparator 104A, will be HIGH. This causes the output of the AND gate 240A to be HIGH. This, in turn, causes the output of the XOR gate 230A to be HIGH (since $Q_{kB}$, by definition, is 0 under these logic conditions). Since $S_0$ 251A and Input 2 (the latter corresponds to the output of the XOR gate 230A) are both HIGH, the MUX 236 flips the value stored in the flip-flop 235.

Similarly, if $V_A > V_B$, but $Q_{kA} < Q_{kB}$, the output of the XOR gate 220A, as well as the output 250A of the comparator 104A, will be HIGH. This causes the output of the AND gate 240A to be HIGH. Since $Q_{kB}$ is 0 (because it is, in this instance, less than $Q_{kA}$), and the output of the AND gate 240 is HIGH, the output of the XOR gate 230A is HIGH. Since $S_0$ 251A is set to HIGH, the MUX 236 selects Input 2 (the output of the XOR gate 230A). Therefore, this has the effect of retaining the value of $Q_{kB}$ in the flip-flop 236.

In the third scenario, where $V_A < V_B$, the result of the priority decoder(s) 241A and a corresponding comparator 104A output 250A are LOW. Accordingly, no sorting is performed. This result is ensured since $S_0$ 251A is set to LOW ($S_1$ and EIC 260 also are LOW), causing the MUX 236 to select Input 1 corresponding to $Q_{kB}$, such that no bit is flipped for any value of k.

Figure 2B:
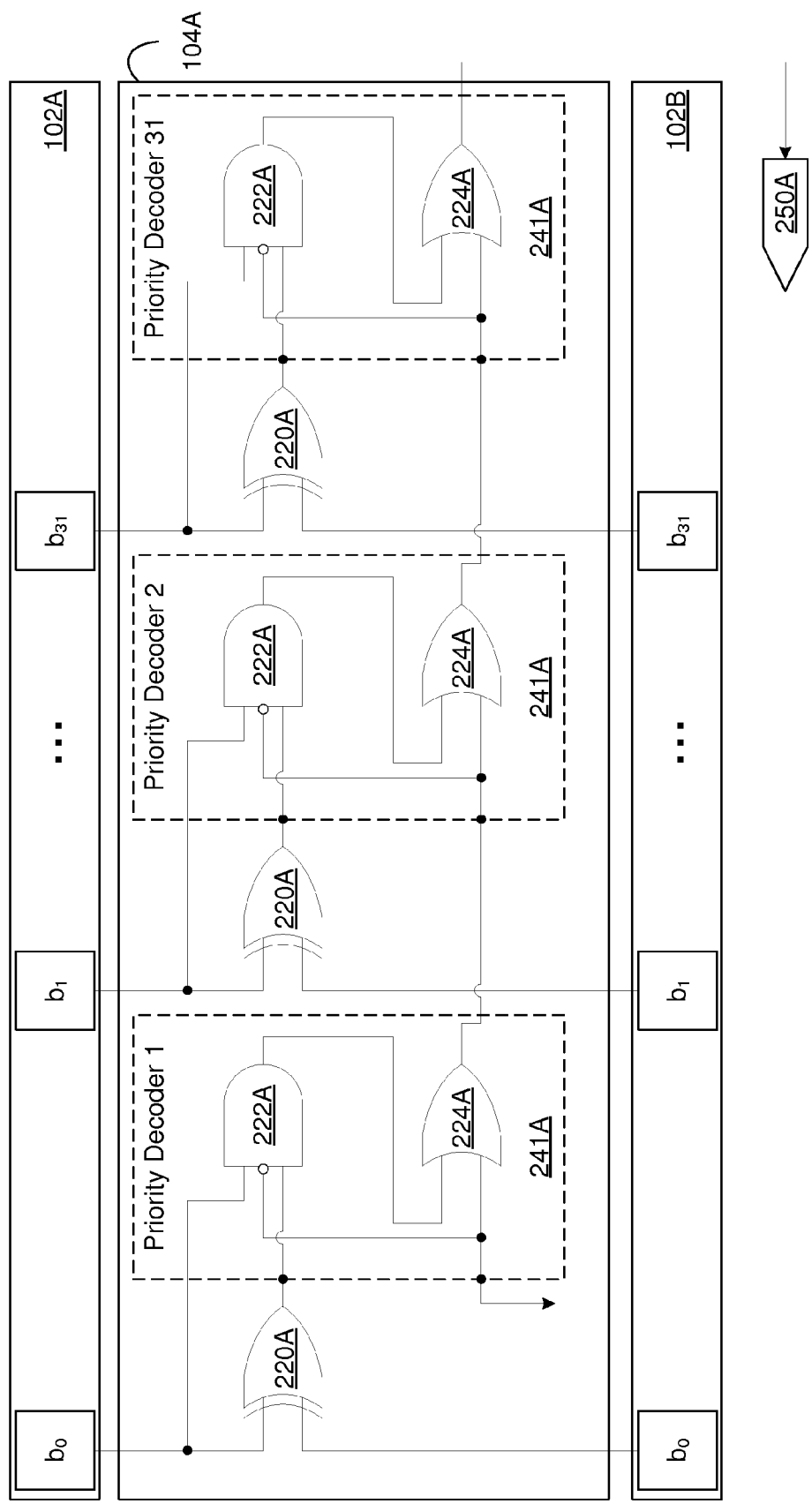
FIG. 2B depicts an exemplary priority decoder component of the one-dimensional local sorting module of FIGS. 1-2A, according to an embodiment of the present disclosure.

FIG. 2B depicts an exemplary priority decoder(s) 241 component of the 1D local sorting module 100 of FIGS. 1-2A, according to an embodiment of the present disclosure. Like elements in FIGS. 1-2B are labeled using like reference characters. The priority decoders 241 may be implemented as components of the comparators 104 of the local sorting module 100, and may be used to determine whether data values stored in adjacent storage elements 102 should be sorted (i.e., reordered). Each comparator 104 may have a corresponding set of priority decoders 241. For example, the comparator 104A may have 32 priority decoders 241A, such as Priority Decoders 1-31 (only Priority Decoders 1, 2 and 31 are shown), one for processing each of 32 bit pairs from the adjacent storage elements 102A and 102B.

For example, in the comparator 104A (the comparator 104A compares data values stored in storage elements 102A and 102B), the result of the operations of the priority decoders 241A is outputted as the comparator output 250A. As discussed in connection with FIG. 2A, above, this output 250A is fed into respective MUXs 236 of the storage elements 102A and 102B as a control signal, which may be an $S_0$ control signal (not shown) in the case of the storage element 102A, or $S_1$ 251B, in the case of storage element 102B.

Generally, given exemplary first and second binary vectors (0110) and (0101), comparing the MSB of each vector (0 in both cases) alone does not allow a determination of which vector is larger, since both bits are equal in this example. Therefore, in such a case, the priority decoders 241A check successive bits of the first vector against corresponding bits of the second vector (pairs of MSB, MSB-1, MSB-2 ... LSB) until one of the priority decoders 241A detects a pair of unequal bits. When a priority decoder 241A detects a pair of unequal bits, a sort operation (i.e., reordering) may be triggered, depending on which vector value is larger, and which sorting order the local sorting module 100 is instructed to carry out.

Accordingly, comparison operations of the priority decoders 241A of the comparator 104A may begin with a comparison of the MSB of corresponding 32-bit values in the storage elements 102A and 102B using an XOR gate 220A, as described above with respect to FIG. 2A. The output of the XOR gate 220A is fed into a corresponding priority decoder 241A (e.g., Priority Decoder 1). If the two bits are different, the output of the XOR gate 220A will be HIGH, indicating that a reordering may be required to perform a sort operation, depending on a final output 250A value of the comparator 104A. A HIGH state of a given XOR 220A output enables a corresponding priority decoder 241A. Accordingly, the output of the XOR gate 220A is fed into an AND gate 222A followed by an OR gate 224A, whose output will also be HIGH when a reordering operation is required. This has the effect of determining whether a sort operation (reordering the contents of the storage elements 102A and 102B) should be carried out.

More specifically, assuming that a sort is to be performed in ascending order, a reordering operation (whether by swapping or flipping bits) may be required if the bit from the storage element 102A is 1, and the bit from the storage element 102B is 0. Where this is the case, the output of the XOR gate 220A is HIGH, which enables the AND gate 222A. The AND gate 222A detects this inequality (since $b_0 = 1$, it means that the MSB $b_0$ of the storage element 102A is larger than that of the storage element 102B). Accordingly, the AND gate 222A output will be HIGH. This, in turn, is detected by the OR gate 224A whose output also will be HIGH. A HIGH output of an OR gate 224A causes the final output 250A of the comparator 104A to be HIGH, because it will cause an output of a subsequent OR gate 224A to be HIGH. The output of the last OR gate 224A corresponds to the output of the priority decoder 104A. If the output of any OR gate 224A is HIGH, no additional bit comparisons are required. Subsequent priority decoders 241A are disable by the HIGH state of the OR gate 224A output from a previous priority decoder 241A, which is inverted and inputted to an AND gate 222A in a next priority decoder 241A.

Where a given pair of MSB bits under comparison (from the storage elements 102A and 102B) are different, and $b_0$ of the storage element 102A is 0 and $b_0$ of the storage element 102B is 1, the AND gate 222A and OR gate 224A outputs are LOW, even though the XOR gate 220A output is HIGH. Therefore the corresponding priority decoder 241A (for example, the Priority Decoder 1) does not generate a HIGH output, and does not cause the output 250A of the comparator 104A to be HIGH. This allows a subsequent priority decoder 241A to compare the next MSB pair.

If the bits in an MSB pair under comparison are equal, the XOR gate 220A output is LOW. This causes outputs of the AND gate 222A and the OR gate 224A to be LOW, which enables the priority decoder 241A to begin to operate and perform a comparison of the next MSB pair. Accordingly, in the case of an ascending sort, the output 250A of the comparator 104A will be HIGH only if the data value stored in the storage element 102A is larger than that of the storage element 102B.

The AND gate 222A has an additional input corresponding to an inverted output of the OR gate 224A. This structure ensures that if the output of the OR gate 224A is HIGH (indicating that a sort is required), subsequent priority decoders 241A need not be activated. The output of the OR gate 224A is fed into subsequent comparators 241A until the last comparator 241A outputs the value as the output 250A of the comparator 104A.

According to an aspect of the disclosure, a program may set a sorting order (ascending or descending) by setting an input value of a series of programmability components (not shown) operatively connected to each of the priority decoders 241A. For example, in the case of the storage elements 102A and 102B under comparison by the comparator 104A, each programmability component may include an XOR gate having inputs of a $b_k$ bit from the storage element 102A and a control input set by the program. The output of the programmability component is fed into the AND gate 222A of the corresponding priority decoder. When the control input is 0, for example, the programmability component may be configured to cause the comparator 104A to perform either an ascending sort or a descending sort, while a control input value of 1 may cause the comparator 104A to perform an opposite sort, i.e., descending or ascending sort.

Referring now to FIGS. 1-2B, certain names have been used to facilitate ease of reference to groups of functional elements of the local sorting module 100. For example, the logic gates 220A, 230A, and 240A have been referenced as belonging to the comparator 104A. It shall be understood by a person of ordinary skill in the art, however, that these components may be grouped together with, for example, the storage element 102B and/or the storage element 102A, without departing from the spirit or scope of the disclosed invention.

Figure 3:
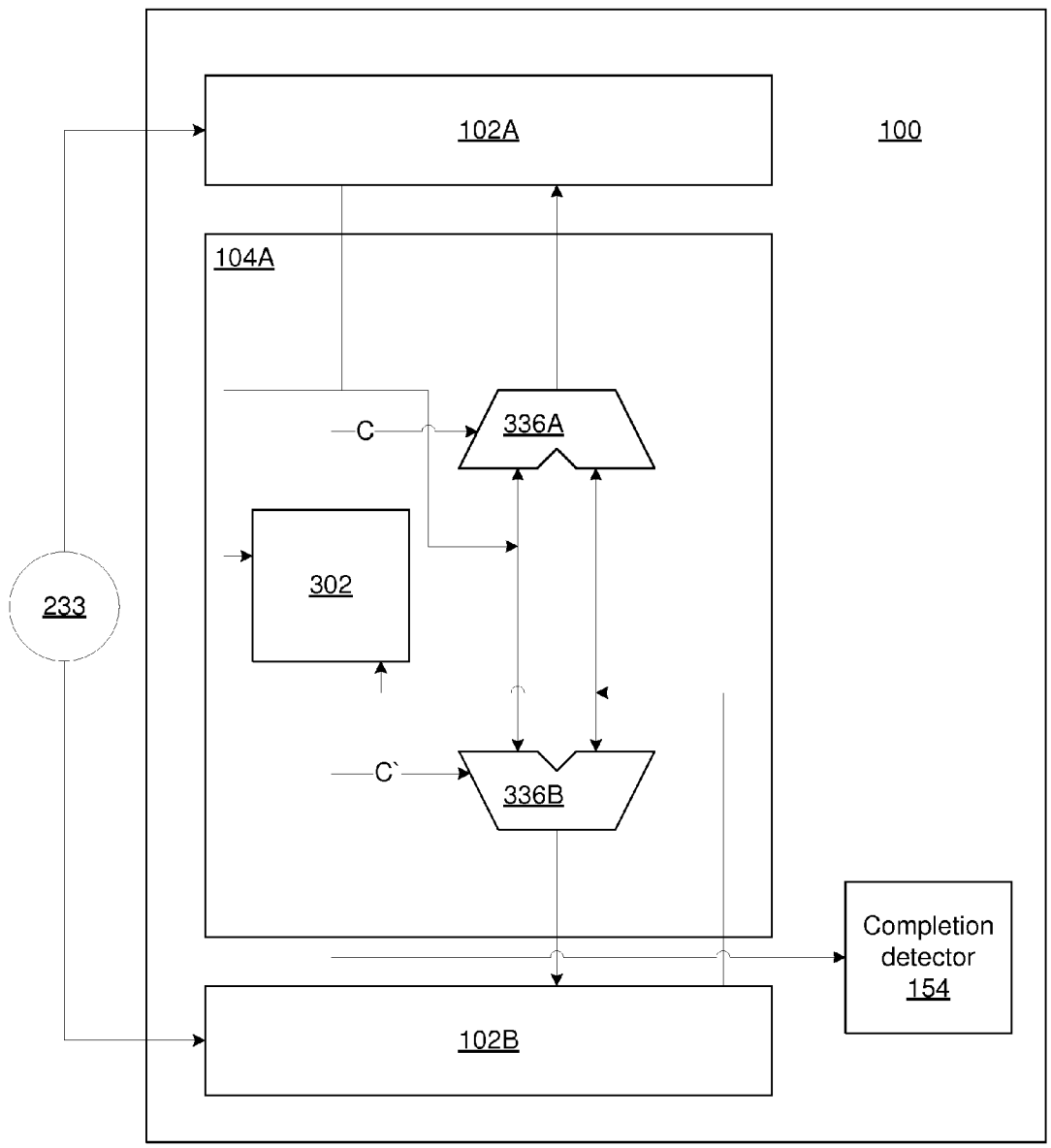
FIG. 3 depicts an exemplary circuit-level implementation of the one-dimensional local sorting module of FIG. 1, using a compare-and-swap technique, according to an embodiment of the present disclosure.

FIG. 3 depicts an exemplary circuit-level implementation of the 1D local sorting module 100 of FIG. 1, using a compare-and-swap technique, according to an embodiment of the present disclosure. Like elements in FIGS. 1 and 3 are labeled using like reference characters. The local sorting module 100 in FIG. 3 includes the storage elements 102A-B, the comparator 104A, the clock 233, and the completion detector 154. It may include additional storage elements and comparators.

According to one embodiment, the comparator 104A includes a comparison unit 302. The comparison unit 302 may include, for example, a set of priority decoders (not shown in FIG. 3), such as the priority decoders 241A described in connection with FIG. 2B, above. The comparison unit 302 receives the bits stored in the storage elements 102A and 102B, and determines if they should be reordered according to a predetermined sorting order. Based on the comparison, the comparison unit 302 generates an output C and its complement, C'. The comparison unit 302 may set C and C' to HIGH where a sort operation is required, and otherwise to LOW.

For each bit-pair from the storage elements 102A and 102B, the comparator 104A includes two multiplexers, MUX 336A and 336B. For clarity, FIG. 3 depicts only one pair of multiplexers and their corresponding connections to other components of the local sorting module 100, including the storage element 102A and 102B, and the comparison unit 302. Both the MUX 336A and the MUX 336B may have at least two inputs: one being a bit stored in the storage element 102A, the other being the bit from the storage element 102B. The MUX 336A and the MUX 336B each have at least one control signal input corresponding to C and C' respectively.

If the value of C and C' are LOW, no sort operation is performed. The MUX 336A selects the bit from the storage element 102A and provides that value as an output that is fed back to the storage element 102A. Similarly, the MUX 336B selects the bit from the storage element 102B and provides that bit as an output that is fed back to the storage element 102B. This has the effect of leaving the bits stored in each of the storage elements 102A-B unchanged. Alternatively, the bits stored in the storage elements 102A-B may be maintained by disabling the clock 233 input to the storage elements 102A-B if C/C' are LOW.

Conversely, if the values of C and C' are HIGH, a swap operation is performed whereby the MUX 336A selects the bit from the storage element 102B and provides that bit as an output that is fed to the storage element 102A for storage. Similarly, the MUX 336B selects the bit from the storage element 102A and provides that bit as an output that is fed to the storage element 102B for storage. This has the effect of swapping the bits stored in each of the storage elements 102A-B during a sort operation. The data storage elements 102A and 102B fetch the MUX 336A and 336B outputs, respectively based on the clock 233 signal, or after the muxing operation has been completed.

According to aspect of the disclosure, the comparison unit 302 also includes an output to the completion detector 154, which may be, in one embodiment, the same signal C' (or C) or a modified form thereof, that signals whether a swap operation is to be performed. For example, if C/C' is HIGH, a swap is to be performed, and the completion detector determines that the sort operation of the local sorting module 100 is incomplete. If the value of C/C' is LOW, however, the completion detector may determine that the sort operation may complete, depending on outputs of other comparators.

Figure 4:
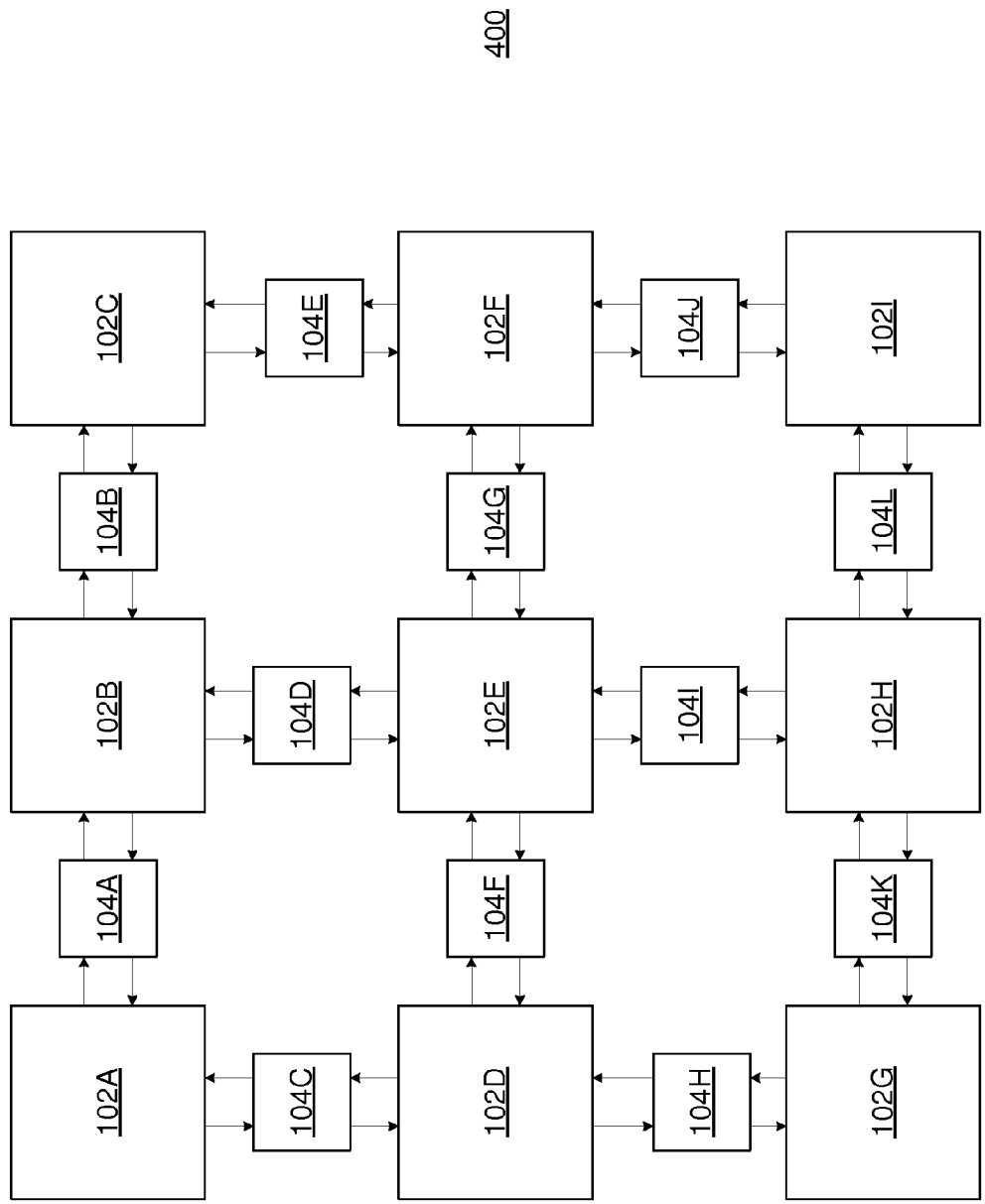
FIG. 4 depicts an exemplary two-dimensional local sorting module, according to an embodiment of the present disclosure.

FIG. 4 depicts an exemplary two-dimensional (2D) local sorting module 400, according to an embodiment of the present disclosure. Aspects of the local sorting module 400 may be similar to aspects of the local sorting module 100 of FIGS. 1-3. Like elements in FIGS. 1-4 are labeled using like reference characters. The local sorting module 400 may be an on-chip or off-chip integrated circuit (IC), and may include a 2D array of storage elements 102A-I, and comparators 104A-L. In another embodiment, the local sorting module 400 may have four storage elements 102 and four comparators 104 arranged in a grid structure, wherein each storage element is substantially adjacent to at least two of the other storage elements, along an x-axis and a y-axis substantially perpendicular to the x-axis, respectively, and wherein each pair of adjacent storage elements includes one comparator situated between the two storage elements.

Each storage element 102A-I may be positioned substantially adjacent to one to four other storage elements, separated from each of them by an intermediary comparator 104. Each intermediary comparator 104 may be configured to perform bitwise compare-and-sort operations with respect to its adjoining storage elements 102. For example, the comparator 104A may have inputs of bits from the storage element 102A-B, and may have output of bits to each of these two storage elements, such that it may sort their respective data values according to a predetermined sorting order. For clarity, additional circuitry of the storage elements 102A-I, and the comparators 104A-L, are omitted. It will be understood by a person of ordinary skill in the art that each of these components may have additional inputs and outputs without departing from or limiting the scope of the present disclosure. These additional inputs may include, for example: data inputs, control signals, clock signals, comparator logic signals, etc. Furthermore, the array of storage elements 102A-I and comparators 104A-L may be expanded to include additional storage elements and comparators, wherein each additional storage element may be adjacent to up to four additional storage elements, and separated from each of them by a comparator.

According to an aspect of the disclosure, the storage elements 102 and the comparators 104 may be as described above in connection with FIGS. 1-3. Furthermore, connections between these components across rows and columns of the local sorting module 400 may be as described in connection with FIGS. 1-3. For example, the storage elements 102A-C and comparators 104A-B may be configured similarly to the storage elements and comparators of the local sorting module 400.

The control signals (not shown) of the comparators 104A-L may be used by a program circuitry and/or other components of a processor to determine whether to perform a sort operation in an ascending or descending order, and whether to perform a sort in a column-wise or row-wise order. For example, a program may set the control signals to perform a partial sort across rows/columns of the local sort module 400, such that a sort is performed first in a row-wise order, for each row, and thereafter, column-wise for each column. To accomplish this, in one embodiment, the program circuitry (not shown) may enable the comparators 104C-E and 104H-J, by activating respective control signal inputs of these comparators, to enable column-wise sorting. For row-wise sorting, the program circuitry may activate respective control signal inputs of comparators 104A, 104F, 104K, and 104B, 104G, 104L.

In one example, the local sorting module 400 may perform a partial sort using the row/column technique. The data values stored in the storage elements 102A-C may first be sorted row-wise. Data values stored in other rows also may be sorted. Thereafter, the data values stored in the storage elements 102A, 102D, and 102G may be sorted column-wise. Data values stored in other columns also may be sorted. In one embodiment of the present disclosure, this sorting technique may sort batches of database entries according to different sorting criteria for difference sub-sequences.

In another example, the local sorting module 400 may perform a complete sort, as follows. Given a 2D array of N rows and M columns, the sort may be implemented by selectively swapping values of storage elements 102 in the following manner. Assuming $X_{i,j}$ corresponds to a storage element 102 in the $i^{th}$ row and $j^{th}$ column, the comparators 104 may be programmed/activated using the program circuitry (not shown) so as to enable the following swap operations:

Swap $(X_{i-1,j}, X_{i,j})$ if $X_{i-1,j} > X_{i,j}$, where i=2 . . . N and j is odd (this performs an ascending swap);

Swap $(X_{i-1,j}, X_{i,j})$ if $X_{i-1,j} < X_{i,j}$, where i=2 . . . N and j is even (this performs a descending swap);

Swap $(X_{N,j}, X_{N,j+1})$ if $X_{N,j} > X_{i,j}$, where j<N is odd; and

Figure 5:
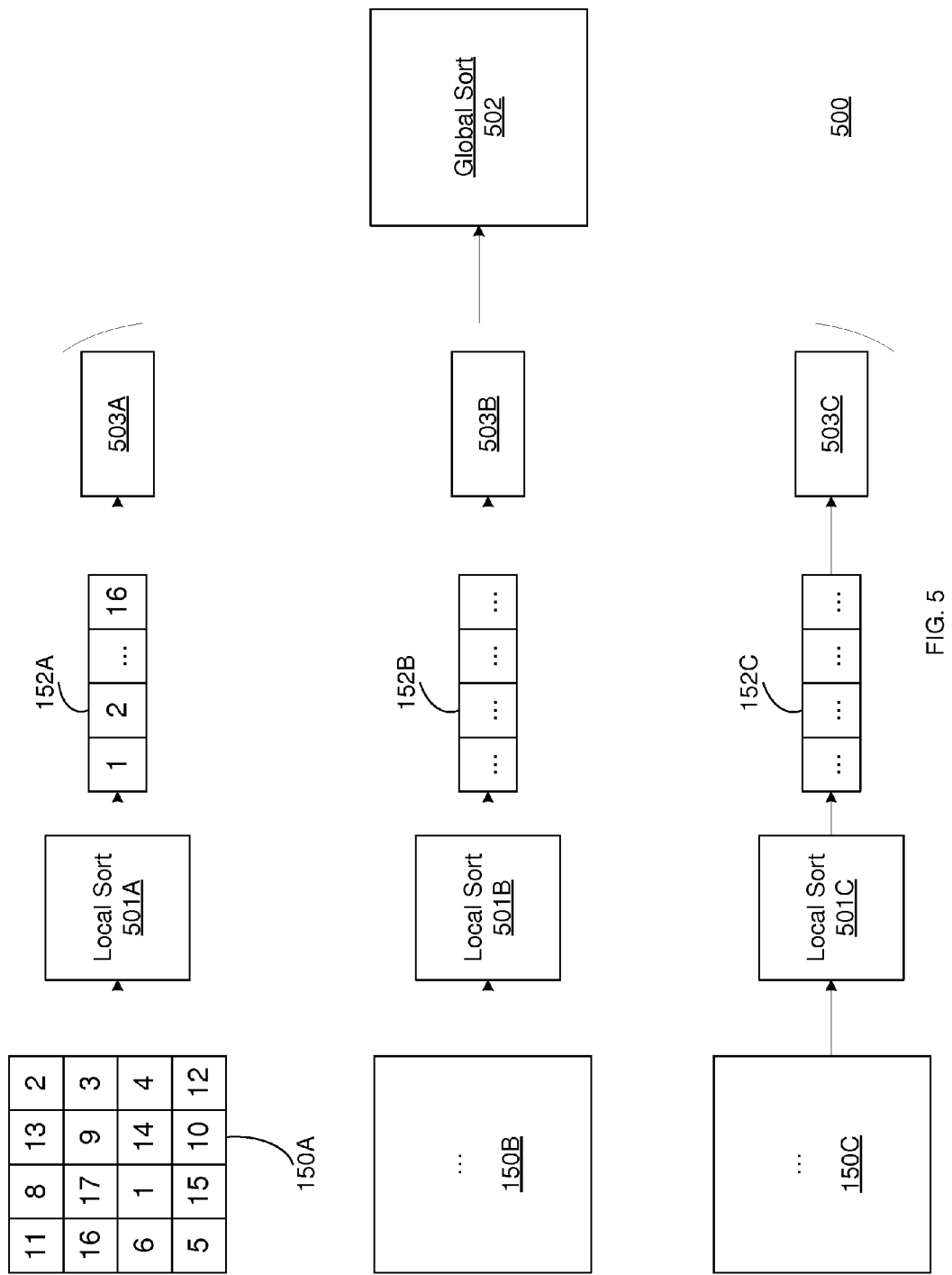
FIG. 5 depicts an exemplary sorting module having a hierarchical sorting structure, according to an embodiment of the present disclosure.

Swap $(X_{N,j}, X_{N,j+1})$ if $X_{N,j} < X_{i,j}$, where j<N is even;

FIG. 5 depicts an exemplary sorting module 500 having a hierarchical sorting structure, according to an embodiment of the present disclosure. Like elements in FIGS. 1-5 are labeled using like reference characters. The sorting module 500 may include two or more local sorting modules 501A-C and a global sorting module 502. This hierarchical sorting structure enables relatively faster sorting operations while minimizing silicon overhead. Each of the local sorting modules 501A-C may be a 1D local sorting module 100 or a 2D local sorting module 400, as described in connection with FIGS. 1-4. Although the sorting module 500 is depicted as having three local sorting modules 501A-C, the sorting module 500 may have a number of local sorting modules in the range of {2-n}. A sort operation may be performed using, in part, all or a subset of the local sorting modules 501A-C of the sorting module 500.

The local sorting modules 501A-C may receive data inputs 150A-C, respectively. The data inputs 150A-C may be, for example, binary arrays or vectors, represented in FIG. 5 using decimal numerals. The local sorting modules 501A-C may receive the data inputs 150A-C from one or more sources, and may sort them in parallel, as described above in connection with FIGS. 1-4, preferably using an even/odd sorting algorithm. However, other sorting approaches may be used, if desired. Each local sorting module 501A-C may generate a sorted list 152A-C based on the input data 150A-C, and generate a corresponding output block 503A-C. Output blocks 503A-C may be provided as an input to the global sort module 502 for further sorting operations.

Figure 6:
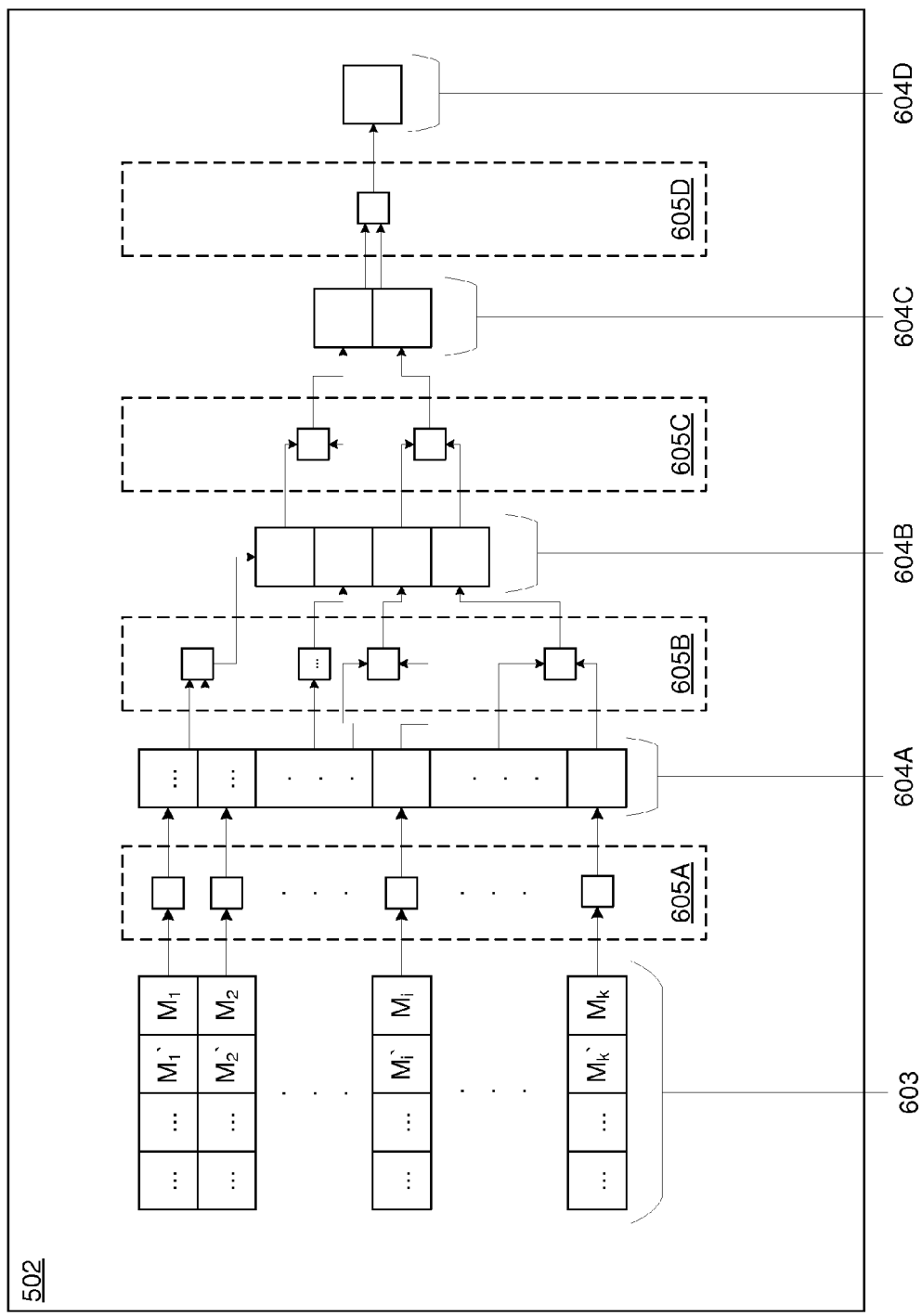
FIG. 6 depicts an exemplary implementation of the global sorting module of FIG. 5, using a pipeline sort technique, according to an embodiment of the present disclosure.

FIG. 6 depicts an exemplary embodiment of the global sorting module 502 of FIG. 5, based on a pipeline sort implementation. Like elements in FIGS. 1-6 are labeled using like reference characters. The global sorting begins after all local sorting has been completed, which can be detected by the global sorting module 502 through communication with the completion detector 154 (FIG. 1). The global sorting module 502 receives k sorted memory blocks 603 ("sorted blocks 603"). The sorted blocks 603 may be, for example, the same as, or generated based on, the sorted blocks 503A-C generated in the sorting module 500 (FIG. 5) by successive local sorting modules 501A-C. In the depicted embodiment, contents of each sorted block 603 are organized as having their minimum value M as the right-most entry of the corresponding memory block, followed by M', and so forth. Each M value may be, for example, a binary vector. It shall be apparent to a person of ordinary skill in the art that the sorted blocks 603 may be sorted in a different order, without departing from the spirit or scope of the present disclosure.

The global sorting module 502 may include a series of buffers 604A-D, whose number may depend, in one embodiment, on the number of elements in each sorted block 602. Each buffer 605 may include a series of storage elements, and may temporarily store elements of the sorted blocks 603, to facilitate compare-and-sort operations during a tournament sort. The tournament determines a winner output corresponding to a smallest value (or largest value, depending on the sort order), based on results of the final set of comparators 604D. Assuming $2^k$ tournament sorts, k stages of buffers 605 may be used to make this determination. This results in significantly faster sorting compared to existing techniques. For example, for sorting 1024 values, only 10 cycles ($\log_2 1024=10$) are required.

The global sorting module 502 may also include a series of comparator sets 605A-D. Each of these comparator sets may, but need not, include comparators 104 as described in connection with FIGS. 1-5, above, and each comparator may be configured to compare two data elements and sort/reorder their contents where necessary. The number of the comparator sets 605 may depend, in one embodiment, on the number of buffers 604. Each pair of buffers 604 may be separated by a comparator set 605. Additionally, the sorted blocks 602 and the first buffer 604A may be separated by a comparator set 605A.

Using the circuitry described above, the sorting module 502 may perform a global sort. According to an exemplary embodiment, performing the global sort may be accomplished as follows. As stated above, the global sorting may begin once all local sorting has been completed.

Initially, the data in the buffers 604A-D may be set to an initialization value by default; for example, all ones ("INF"), or all zeroes. The smallest element ($M_i$) from each sorted block 602 may be compared with the value stored in a corresponding storage element in the first buffer 604A using a corresponding comparator in the comparator set 605A. In the first operational pass of the circuitry, each smallest sorted block 602 element $M_i$ is compared to the (INF) value stored in the buffer 604A, in which case the comparison may necessitate a swap. For each sorted block 602, this has the effect of entering (INF) into the right-most element of that sorted block 602. This results in a completion detector being reset, which causes the compare operation between consecutive elements in the sorted block 602 to resume, such that the INF value is moved to a left-most position in the array, and M' is moved to the M position. Since (INF) is greater than all other elements in each of the sorted blocks 602, each block is shifted to the right. For example, in the case of the first sorted block 602, $M_1$ is swapped with (INF) stored in a first storage element of the buffer 604A via a first comparator in the comparator set 605A. Subsequently, the first sorted block 604A is restored such that $M_1'$ moves into the $M_1$ position for comparison during a subsequent cycle. Alternatively, the sorted blocks 603 may operate as simple shift registers to provide the input to a first tournament stage of buffer 605A. A shift resister may shift a given bit to the right only when the bit is moved to the next stage as a tournament winner.

Neighboring elements within the first buffer 604A are compared using the comparators in the comparator set 605B, and in each comparison, the smaller element is swapped with the corresponding element in buffer 604C. This process continues with respect to other buffers 604 using additional comparator sets 605 until the overall smallest element is obtained as the output after k cycles. Consequently, the global sorting module 502 outputs one element per cycle, which is the overall minimum element within all sorted blocks 602.

As each minimum element is outputted by the global sorting module 502, another element is swapped from the corresponding sorted block 602, which originally contains the outputted minimum element, into the first buffer 604A.

The above process is repeated until all elements of the sorted blocks 602 are evaluated and outputted by the global sorting module 502, in order.

Since data in the first buffer 604A may be written from the sorted blocks 602 while simultaneously being read out and swapped with contents of the second buffer 604B, master and slave buffering stages may be implemented. Techniques for implementing master and slave buffer are well known to persons of ordinary skill in the art.

Implementing the global sorting techniques described above may require additional storage elements than may otherwise be used in a given system architecture. To minimize a potential increase in silicon overhead, selecting local and global sort module lengths may take the following into consideration. Using relatively more storage elements for local sorting may require more sorting time with less silicon area. Using relatively more storage elements for global sorting may shorten sorting time, but may increase silicon overhead. Therefore, it may be desirable to implement the above described hierarchical sorting, whereby performing local sorts first, followed by global sorts, may provide an optimal approach in terms of performance and silicon overhead.

Figure 7A:
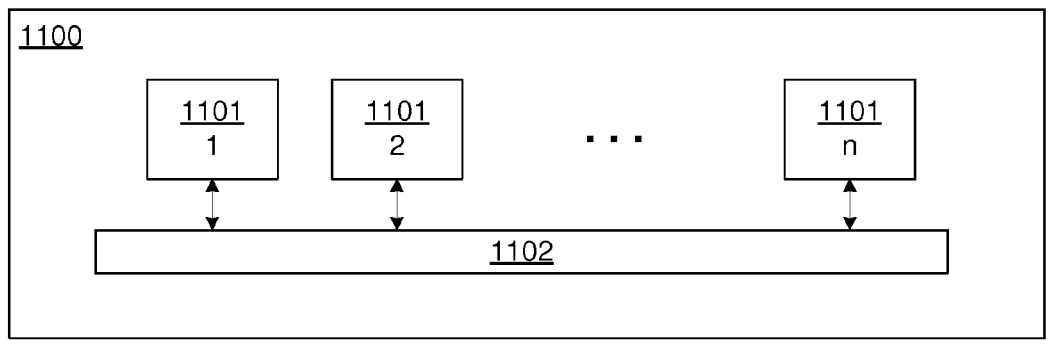
FIG. 7A depicts an exemplary implementation of the sorting modules of FIGS. 1-6 as an on-chip module, according to an exemplary embodiment of the present disclosure.

FIG. 7A depicts an exemplary implementation of the sorting modules of FIGS. 1-6 as an on-chip module, according to an exemplary embodiment of the present disclosure. A computer processor 1100 may include on-board circuitry including one or more sorting modules 1101 1-n. Each of the sorting modules 1101 may be, for example, a local sorting module, global sorting module, or a combination thereof, as described above in connection with FIGS. 1-6. The sorting modules 1101 may be interconnected with one another and with the processor 1100 using, for example, an on-chip bus 1102. Data may be written onto each sorting module 1101 using, for example, a direct memory access (DMA) interface. Data may be fetched via DMA from on-chip memories onto the sorting module 1101.

Figure 7B:
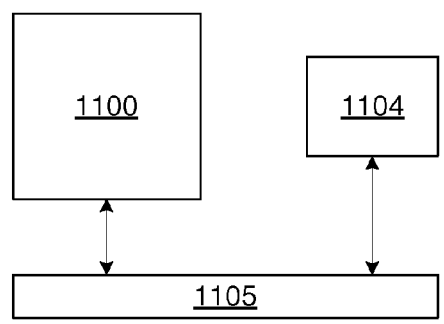
FIG. 7B depicts an exemplary implementation of the sorting modules of FIGS. 1-6 as an off-chip accelerator, according to an exemplary embodiment of the present disclosure.

FIG. 7B depicts an exemplary implementation of the sorting modules of FIGS. 1-6 as an off-chip accelerator, according to an exemplary embodiment of the present disclosure. The processor 1100 may communicate with one or more sorting modules 1104, which may be a local sorting module, global sorting module, and/or a combination thereof, operatively connected to the processor 1100 via an off-chip bus 1105. The sorting module 1104 may also be implemented as part of main memory. Data may be written into the sorting module 1104 via DMA through the off-chip bus 1105. Upon completion of sort operations, an interrupt may be issued to the processor 1100 to cause sorted data to be retrieved from the sorting module 1104 through a DMA operation.

What is claimed is:

1. A local sorting module comprising:
a first data storage element;
a second data storage element, wherein the first and second data storage elements are operatively connected via a first comparator;
a third data storage element, wherein the second and third data storage elements are operatively connected via a second comparator;
a fourth data storage element, wherein the third and fourth data storage elements are operatively connected via a third comparator, and the first and fourth data storage elements are operatively connected via a fourth comparator; and
wherein the first, second, third, and fourth comparators are configured to logically compare data stored in adjacent ones of the first, second, third, and fourth data storage elements according to a sorting order indicated by a processor.

2. The local sorting module of claim 1, further comprising:
a global sorting module, the global sorting module performing a global sort based on receiving sorted outputs from the local sorting module and one or more additional local sorting modules.

3. The local sorting module of claim 2, wherein the global sorting module comprises:
a first set of comparators configured to perform conditional sort operations between respective minimum data values of the sorted outputs and corresponding data values stored in a first buffer; and
one or more additional buffers, wherein each pair of the one or more additional buffers is operatively connected via a corresponding set of additional comparators;
wherein the global sorting module is configured to conditionally sort data values stored in the one or more additional buffers via corresponding sets of the additional comparators.

4. The local sorting module of claim 3, further comprising:
a completion detector configured to detect outputs of the first, second, third and fourth comparators to determine a completion of sorting operations.

5. The local sorting module of claim 1, further comprising:
a programmability component for each of the first, second, third and fourth comparators, the programmability component configured to receive a signal set by a program to determine a sorting order.

6. The local sorting module of claim 2, wherein the global sorting module is a tournament-based global sorting module.

7. The local sorting module of claim 1, wherein the local sorting module and the processor are housed on a processor chip, and the local sorting module is connected to the processor via an on-chip bus.

8. The local sorting module of claim 1, wherein the local sorting module is extraneous to a processor chip containing the processor, and the sorting module is connected to the processor via an off-chip bus.

9. The local sorting module of claim 1, wherein the data is fetched from a memory element to the local sorting module via a direct memory access (DMA) interface, whereby an interrupt is generated by a system, the system comprising the local sorting module, to the processor upon completion of sorting operations, and the processor retrieves sorted data from the local sorting module.

10. The local sorting module of claim 1, wherein the first, second, third and fourth comparators of the local sorting module are configured to perform one or more of:
   a compare-and-flip sorting operation; and
   a compare-and-swap sorting operations.

11. The local sorting module of claim 1, wherein the first comparator comprises a first priority decoder for comparing a first data word stored in the first data storage element with a second data word stored in the second data storage element, the first and the second data storage elements being adjacent, the first priority decoder comprising:
   a first AND gate generating a first output based on receiving both a first bit of the first data word and an output of a first XOR gate, the first XOR gate receiving both the first bit of the first data word and a first bit of the second data word; and
   a first OR gate generating a second output based on receiving the first output, and
   a grounded input.

12. The local sorting module of claim 11, further comprising a second priority decoder, the second priority decoder comprising:
   a second AND gate generating a third output based on receiving a second bit of the first data word, an inverted value of the second output, and an output of a second XOR gate, the second XOR gate receiving the second bit of the first data word and a second bit of the second data word.

13. The local sorting module of claim 1, wherein the local sorting sorts the data stored in adjacent ones of the first, second, third, and fourth data storage elements according an even-odd sort algorithm.

* * * * *